R. G. KNOX.
Handle-Extension Attachment for Brooms, &c.

No. 200,203. Patented Feb. 12, 1878.

Attest.
Harrison Wilson
John Walter Knox

Inventor.
Robert Grigg Knox

UNITED STATES PATENT OFFICE.

ROBERT G. KNOX, OF SIDNEY, OHIO.

IMPROVEMENT IN HANDLE-EXTENSION ATTACHMENTS FOR BROOMS, &c.

Specification forming part of Letters Patent No. 200,203, dated February 12, 1878; application filed November 10, 1877.

*To all whom it may concern:*

Be it known that I, ROBERT GRIGG KNOX, of Sidney, in the county of Shelby and the State of Ohio, have invented a new and useful Improvement in a Handle-Extension Attachment, of which the following is a specification:

The attachment may be made of brass, sheet-iron, or any other suitable metal. Its size will be regulated by the diameter and length of handles sought to be joined.

Figure 1:
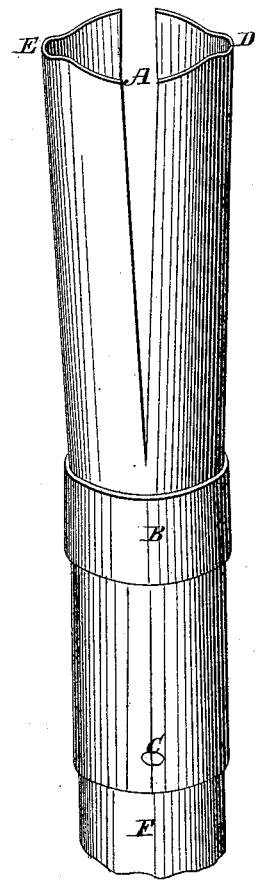
Figure 2:
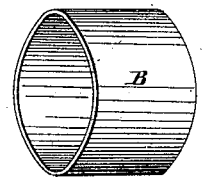

It consists of a cylinder, as in Figure 1 of the drawing, and a ring or band of the same metal, as in Fig. 2. At one end of the cylinder are two openings, (marked A,) which extend about three-fifths of the whole length of the cylinder. At the same end of the cylinder are two raised ridges, (marked D and E, respectively,) which are in extent about half the length of the cylinder. The other end of the cylinder is round and closed. The attachment is fastened at the round end of the cylinder by inserting the handle F of broom or other implement in use in the same, and securing it there by the rivet, (marked C.) The extension is then placed in the other end of the cylinder, and the band B, which is sliding and adjustable, is then pushed up, gaining a purchase on the ridges D and E, and closing the openings A until the extension is firmly clasped and held in the mouth of the cylinder. The head of the rivet C is made large enough to prevent the band B from slipping off the cylinder.

In the accompanying drawings, in which similar letters of reference indicate like parts, Figs. 1 and 2 represent the cylinder and band, respectively, used in the device.

I claim as new—

The peculiar formation of the end of the cylinder with the openings A and ridges D and E, and the combination of the sliding band B and the cylinder when thus formed.

ROBERT GRIGG KNOX.

Witnesses:
 HARRISON WILSON,
 JNO. W. KNOX.